Patented Jan. 10, 1933

1,894,162

UNITED STATES PATENT OFFICE

OTTO DALMER AND CLAUS DIEHL, OF DARMSTADT, GERMANY

NEW CHOLINE DERIVATIVE AND PROCESS FOR MAKING SAME

No Drawing. Application filed April 18, 1931, Serial No. 531,252, and in Germany May 8, 1930.

The present invention relates to the production of a new type of compounds having therapeutic properties, viz: carbamic acid esters from compounds of the choline type. Such substances have hitherto neither been described nor have these been known; so far only compounds have been known in which one hydrogen atom of the $NH_2$ group has been substituted by an aryl group. These substances possess anæsthetic properties, whilst the products of the present invention affect the blood-pressure without having the disagreeable physical properties of other choline compounds. It has been shown that generally speaking these products show the above-mentioned properties. Especially it has been shown that the methochloride of carbamic acid-$\beta$-di-methyl-amino-ethyl-ester (trimethyl-, [(amino-formyl-)-$\beta$-oxy-ethyl]-ammonium chloride) is most advantageously applied. The above compounds are prepared by reaction of a substance with aliphatic halogen and a tertiary aliphatic base, whilst one hydrogen atom of one alkyl of one of the two mentioned starting materials is substituted by the "carbaminoyloxy-" radical

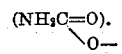

The reaction is carried out as the case may be with or without heating; in many cases heating will be necessary and in all cases heating is applicable.

Solution must not be applied, but it is advantageous to use it. The solvent is chosen in such a way that both starting products are dissolved.

Generally the following solvents have proved as advisable in use: ethyl-alcohol, methyl-alcohol, acetone, chloroform.

Examples 1. 21.5 grams $\beta$-iodo-ethyl-urethane are brought together with 6–7 grams of trimethylamine in a vessel capable of being firmly closed. After standing for a day at room temperature, quantitative addition will have taken place. The snow white product is powdered and re-crystallized from boiling methyl-alcohol. In this way the methiodide of carbamic acid-$\beta$-dimethyl-amino-ethyl-ester (trimethyl-, [(amino-formyl-)-$\beta$-oxy-ethyl]-ammonium-iodide) is obtained as a snow white crystalline powder which turns slightly yellow in day-light and which has a melting point of 200° C. The substance dissolves readily in water with a neutral reaction. The chloride forms well defined thin crystals melting at 208° C. which are stable to light.

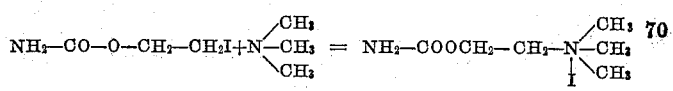

2. 16 grams of carbamic acid $\beta$-diethyl-amino-ethyl-ester are boiled for ½ hour under a reflux condenser with 1,5 grams methyl-iodide and 50 cc. methyl-alcohol. The reaction product is stirred with ether, filtered off and crystallized several times from absolute alcohol. In this way one obtains the methiodide of carbamic acid-$\beta$-diethyl-amino-ethyl-ester (diethyl-, methyl-, [(amino-formyl-)-$\beta$-oxy-ethyl-]-ammonium-iodide) in beautiful white crystals of melting point 123–124° C. which are easily soluble in water. The yield is satisfactory.

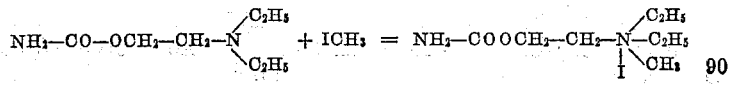

3. 11 grams γ-chloropropyl-urethane (melting point 60–61°) are heated with 5 grams of trimethyl amine in a closed vessel for 7 hours up to 50°. The obtained crystals are powdered with acetone, sucked off and dissolved in boiling methanol; acetone is added.

The methochloride of carbamic acid-γ-dimethylamino-propyl-ester is separated off in beautiful water-soluble crystals of a melting point of 207–208° C.

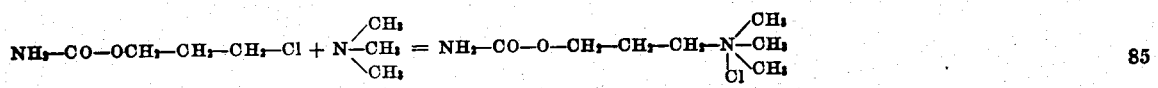

4. 7 grams α-methyl-α-ethyl-β-dimethylamino-carbamic-acid ethylester are heated with 10 cc. methyl-alcohol and 10 g. methyl-iodide by means of vapour, whereby crystallization takes place. The separated iodine-methylate of α-methyl-α-ethyl-β-dimethylamino-carbamic acid ethylester is re-crystallized from methyl alcohol-acetone and forms a nearly white water and alcohol soluble crystal powder of a melting point of 230°.

5. 16 grams of carbamic acid-β-diethylamino-ethyl-ester are heated for 3 hours in a sealed tube at 50° C. with 17 grams of ethylene iodo-hydrine (molecular weight 172). The reaction product, which crystallizes after cooling, is worked up with ether, filtered off and re-crystallized several times from absolute alcohol. β-oxy-ethyl-iodide of carbamic acid-β-diethyl-amino-ethyl-ester (diethyl-, -β-oxy-ethyl-, [(amino-formyl-)-β-oxy-ethyl-]-ammonium-iodide) is obtained in good yield in white crystals easily soluble in water, having a melting point of 105–107° C.

6. 16 grams of carbamic acid-β-diethylamino-ethyl-ester and 21.5 grams of β-iodide-ethyl-urethane (molecular weight 215) dissolved therein. It is then heated for 5 hours in a sealed tube at 90° C. By rubbing up the cooled viscous mass with ether, it becomes crystalline. The crystal cake after separation is again rubbed up with acetone and re-crystallized from absolute alcohol. In this way the iodo-(amino-formyl-β-oxy)-ethylate of carbamic acid-β-diethyl-amino-ethyl-ester (diethyl-di-[(amino-formyl-)-β-oxy-ethyl-]-ammonium-iodide) is obtained in good yield and having a melting point of 151° C.

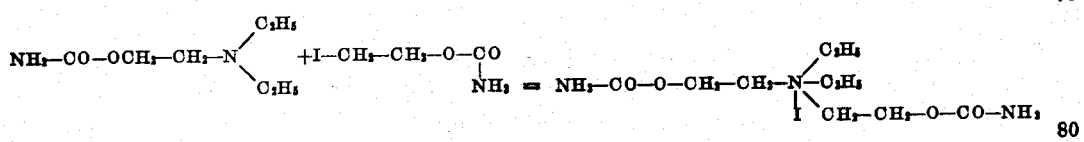

7. Molecular weights of carbamic acid-β-diethyl-amino-ethyl-ester and ω-bromo-acetophenone are melted together for a short time. The vitreous melt is rubbed up with acetone, filtered off and the product re-crystallized from absolute alcohol. The phenacyl-bromide of carbamic acid-β-diethyl-amino-ethyl-ester (diethyl-, phenacyl-, [(amino-formyl-)-β-oxy-ethyl]-ammonium-bromide) forms white small needles united into bunches, which are soluble in water with a neutral reaction and have a melting point of 182° C.

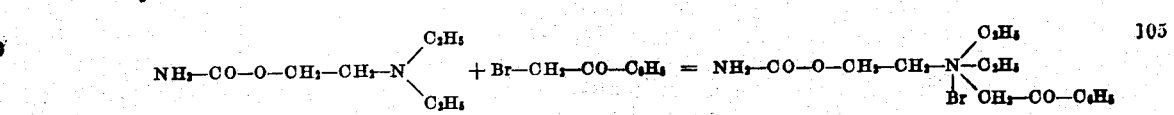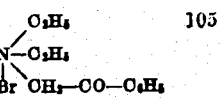

8. 16.5 grams of hordenine base (molecular weight 165) are boiled under a reflux for one hour with 21.5 grams of β-iodo-ethyl-urethane and 60 cc. methyl alcohol, the methyl alcohol drawn off in a vacuum and the syrupy residue taken up in quite a small quantity of warm absolute alcohol. After standing for about 24 hours in the cold crystalline aggregates are formed. These are removed and worked up with chloroform, dried and re-crystallized several times from absolute alcohol. In this way there is obtained the iodo-β-(4-oxy-phenyl-)-ethylate of carbamic acid-β-dimethyl-amino-ethyl-ester (dimethyl-[β-(4-oxy-phenyl)-ethyl]-,[(amino-formyl-)-β-oxy-ethyl-]-ammonium-iodide) in white crystals which melt at 152–153° C. and

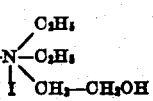

which are easily soluble in water with a neutral reaction.

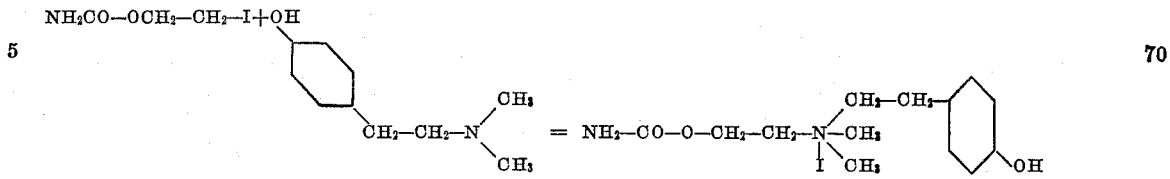

9. Molecular quantities of pseudo 1-phenyl-,1-(amino-formyl-)-oxy-,2-dimethylamino-propane and methyl iodide are heated for a short time in methyl alcohol on the steam bath. The reaction product is rubbed up with ether and recrystallized from absolute alcohol. The methiodide of pseudo 1-phenyl-,1-(amino-formyl-)-oxy-,2-dimethylamino-propane melts at 220–221° C. and is easily soluble in water.

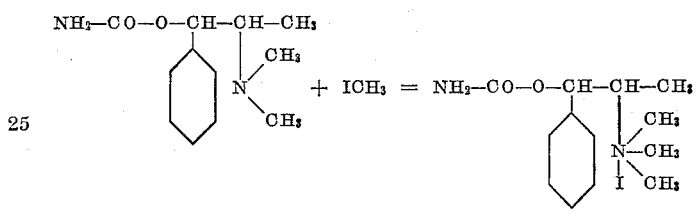

We claim:

1. Process for the production of derivatives of the choline type consisting in bringing into chemical combination by means of heating equi-molecular quantities of a saturated aliphatic halogen compound, the halogen of which is of the character and reactivity of the alkyl halides, with a saturated aliphatic tertiary base, the nitrogen atom of the latter being bound to an aliphatic chain, while one hydrogen atom of one alkyl of one of the two mentioned starting materials is substituted by the "carbaminoyloxy" radical $$(NH_2C=O)\diagdown O-$$

2. Process for the production of derivatives of the choline type consisting in bringing into chemical combination by means of heating in solution equi-molecular quantities of a saturated aliphatic halogen compound, the halogen of which is of the character and reactivity of the alkyl halides, with a saturated aliphatic tertiary base, the nitrogen atom of the latter being bound to an aliphatic chain, while one hydrogen atom of one alkyl of one of the two mentioned starting materials is substituted by the "carbaminoyloxy" radical $$(NH_2C=O)\diagdown O-$$

3. As a new and useful product of therapeutic value the methochloride of carbamic acid-β-dimethyl-amino-ethyl-ester (trimethyl-, [(amino-formyl-)-β-oxy-ethyl]-ammonium-chloride) consisting of snow white crystalline powder which melts at 200° C., being easily soluble in water, therein showing a neutral reaction, having the following formula:—

4. Process for the production of derivatives of the choline type consisting in bringing into chemical combination by means of heating one mole of a saturated alkyl halide with one mole of a saturated aliphatic tertiary nitrogenous base, while one hydrogen atom of one alkyl of one of the two mentioned starting materials is substituted by the "carbaminoyloxy" radical $$(NH_2C=O)\diagdown O$$

OTTO DALMER.
CLAUS DIEHL.